US012603594B2

(12) United States Patent
Zhang et al.

(10) Patent No.: US 12,603,594 B2
(45) Date of Patent: Apr. 14, 2026

(54) VOICE COIL MOTOR, METHOD AND DEVICE FOR CONTROLLING VOICE COIL MOTOR

(71) Applicant: GOERTEK INC., Weifang City (CN)

(72) Inventors: Yifan Zhang, Weifang City (CN);
Pengbo Feng, Weifang City (CN);
Xueqiang Wang, Weifang City (CN);
Tao Han, Weifang City (CN)

(73) Assignee: GOERTEK INC., Weifang City (CN)

( * ) Notice: Subject to any disclaimer, the term of this patent is extended or adjusted under 35 U.S.C. 154(b) by 435 days.

(21) Appl. No.: 18/449,141

(22) Filed: Aug. 14, 2023

(65) Prior Publication Data

US 2023/0402949 A1     Dec. 14, 2023

Related U.S. Application Data

(63) Continuation of application No. PCT/CN2021/131366, filed on Nov. 18, 2021.

(30) Foreign Application Priority Data

Feb. 23, 2021    (CN) .......................... 202110202517.9

(51) Int. Cl.
*H02P 25/034*        (2016.01)
*H02P 7/025*         (2016.01)
(52) U.S. Cl.
CPC ............ *H02P 25/034* (2016.02); *H02P 7/025* (2016.02)
(58) Field of Classification Search
CPC ............................... H02P 25/034; H02P 7/025
See application file for complete search history.

(56) References Cited

U.S. PATENT DOCUMENTS 8,964,432 B2    2/2015  Tang et al.
2006/0055252 A1  3/2006  Tseng
(Continued)

FOREIGN PATENT DOCUMENTS

CN        1144988 A      3/1997
CN      101009455 A      8/2007
(Continued)

OTHER PUBLICATIONS

First Office Action issued in Chinese Application No. 202110202517.9; mailed Apr. 28, 2022; 12 pgs.
(Continued)

*Primary Examiner* — Zoheb S Imtiaz
(74) *Attorney, Agent, or Firm* — HAUPTMAN HAM, LLP

(57)     ABSTRACT

Disclosed are a voice coil motor, a method and a device for controlling the voice coil motor. The voice coil motor includes an outer coil module and an inner coil module inside the outer coil module, an air gap for the inner coil module to move is formed between the inner coil module and the outer coil module. The method includes: driving the outer coil module to generate an outer coil electromagnetic force; determining an inner coil current instruction according to an expectation force instruction and force feedback information sent by an executing mechanism of the voice coil motor; driving the inner coil module of the voice coil motor to generate an inner coil electromagnetic force according to the inner coil current instruction; and enabling the executing mechanism to generate a motor acting force according to the outer coil electromagnetic force and the inner coil electromagnetic force.

10 Claims, 4 Drawing Sheets

(56)         References Cited

U.S. PATENT DOCUMENTS

2009/0024009  A1*   1/2009  Freeman ............ A61B 5/15174
                                                        600/309
2009/0085558  A1    4/2009  David et al.
2013/0215526  A1    8/2013  Park
2022/0385221  A1*  12/2022  Herrnberger .............. H02P 6/18

FOREIGN PATENT DOCUMENTS

CN        101064169  A    10/2007
CN        101404438  A     4/2009
CN        201234176  Y     5/2009
CN        101572472  A    11/2009
CN        106533063  A     3/2017
CN        108712055  A    10/2018
CN        109639086  A     4/2019
CN        111404436  A     7/2020
CN        111478631  A     7/2020
CN        113162512  A     7/2021
GB         2431294  B     4/2009

OTHER PUBLICATIONS

Notice of Grant issued in Chinese Application No. 202110202517.9;
mailed Aug. 1, 2022; 5 pgs.
International Search Report and Written Opinion issued in International Patent Application No. PCT/CN2021/131366; mailed Jan. 28,
2022; 16 pgs.
Yin, Xunfeng et al; "Research on force/bit control system of voice
coil motor based on force compensation control"; Automation and
Instrumentation; vol. 10, 2016; pp. 9-11.

* cited by examiner

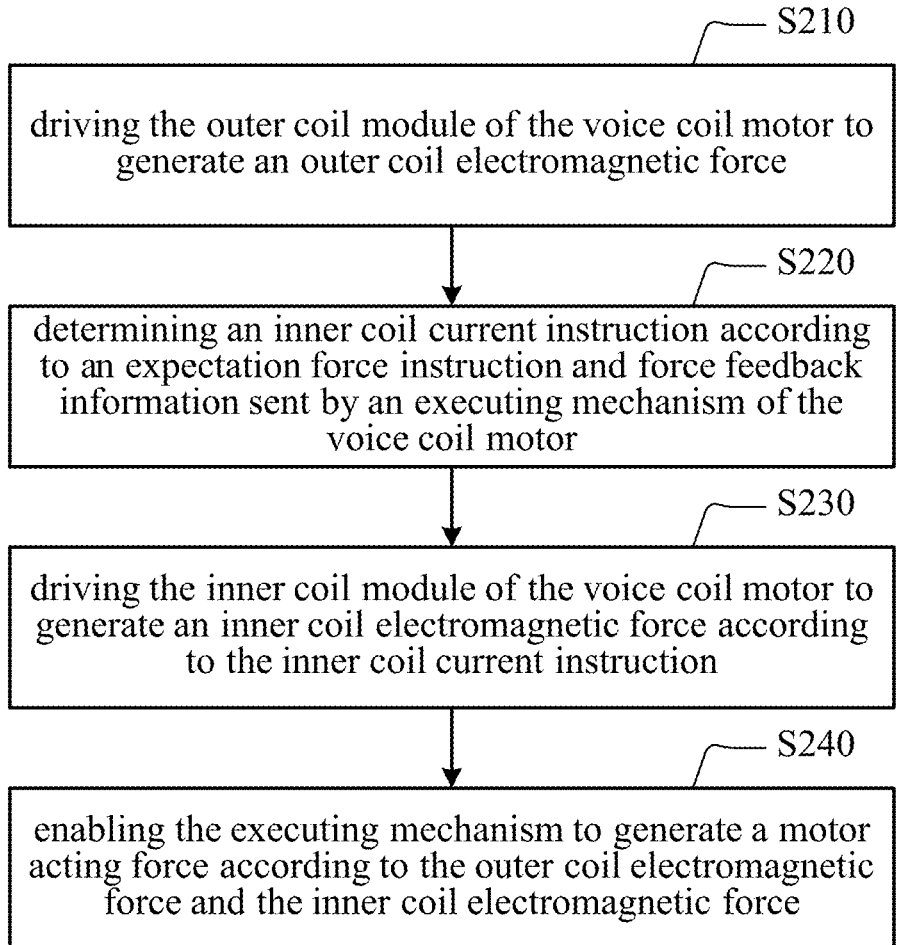

S210 driving the outer coil module of the voice coil motor to generate an outer coil electromagnetic force

S220 determining an inner coil current instruction according to an expectation force instruction and force feedback information sent by an executing mechanism of the voice coil motor

S230 driving the inner coil module of the voice coil motor to generate an inner coil electromagnetic force according to the inner coil current instruction

S240 enabling the executing mechanism to generate a motor acting force according to the outer coil electromagnetic force and the inner coil electromagnetic force

FIG. 2

VOICE COIL MOTOR, METHOD AND DEVICE FOR CONTROLLING VOICE COIL MOTOR

CROSS-REFERENCE TO RELATED APPLICATIONS

This application is a continuation application of International Application No. PCT/CN2021/131366, filed on Nov. 18, 2021, which claims priority to Chinese Patent Application No. 202110202517.9, filed on Feb. 23, 2021. The disclosures of the above-mentioned applications are incorporated herein by reference in their entireties.

TECHNICAL FIELD

The present application relates to the technical field of motors, in particular to a voice coil motor, a method and a device for controlling a voice coil motor.

BACKGROUND

For the past few years, in the fields of consumer electronics, semiconductors, medical equipment and other product assembly and production, accuracy and complexity of products have been continuously improved, and requirements for the operation speed and the control accuracy of the production equipment have been increased. In scenarios where force control is required, voice coil motors are more and more widely used in the high-speed and high-accuracy equipment due to the advantages of the voice coil motor such as a fast response speed and a high control accuracy.

Currently, the common voice coil motor includes a permanent magnet and a coil. The magnetic field generated by the permanent magnet interacts with the magnetic field generated by the energized coil conductor, to cause motion. In addition, combined with the feedback and control system, the voice coil motor can achieve accuracy control.

However, since the magnetic field and the magnetic induction intensity generated by the permanent magnet cannot be actively controlled and adjusted, and the strength of the magnetic field is easy to change in scenarios with high temperature, high heat and impact, the motion and the control accuracy of the voice coil motor will be affected.

SUMMARY

Embodiments of the present application provide a voice coil motor, a method and a device for controlling a voice coil motor, to enhance the environmental adaptability and stability of the voice coil motor, and improve the motion and control accuracy of the voice coil motor.

Embodiments of the present application adopt the following technical solutions.

In a first aspect, embodiments of the present application provide a method of controlling a voice coil motor including an inner coil module and an outer coil module, the inner coil module is arranged inside the outer coil module, an air gap for the inner coil module to move is formed between the inner coil module and the outer coil module, and the method includes: driving the outer coil module of the voice coil motor to generate an outer coil electromagnetic force; determining an inner coil current instruction according to an expectation force instruction and force feedback information sent by an executing mechanism of the voice coil motor; driving the inner coil module of the voice coil motor to generate an inner coil electromagnetic force according to the inner coil current instruction; and enabling the executing mechanism to generate a motor acting force according to the outer coil electromagnetic force and the inner coil electromagnetic force.

In a second aspect, embodiments of the present application further provide a device of controlling a voice coil motor, the voice coil motor includes an inner coil module and an outer coil module, the inner coil module is arranged inside the outer coil module, an air gap for the inner coil module to move is formed between the inner coil module and the outer coil module. The device includes: an outer coil control unit configured to drive the outer coil module of the voice coil motor to generate an outer coil electromagnetic force; an inner coil control unit configured to determine an inner coil current instruction according to an expectation force instruction and force feedback information sent by an executing mechanism of the voice coil motor, and drive the inner coil module of the voice coil motor to generate an inner coil electromagnetic force according to the inner coil current instruction; and an executing unit configured to allow the executing mechanism to generate a motor acting force according to the outer coil electromagnetic force and the inner coil electromagnetic force.

In a third aspect, embodiments of the present application further provide a voice coil motor, including a base, a movable inner coil module, an outer coil module and an executing mechanism. The outer coil module is embedded at the base, the inner coil module is arranged inside the outer coil module, and an air gap for the inner coil module to move is formed between the inner coil module and the outer coil module. The executing mechanism is connected to the inner coil module. The outer coil module generates an outer coil electromagnetic force in response to the device for controlling the voice coil motor as mentioned above, and the inner coil module generates an inner coil electromagnetic force in response to the device for controlling the voice coil motor as mentioned above, to allow the executing mechanism to generate a motor acting force according to the outer coil electromagnetic force and the inner coil electromagnetic force.

At least one technical solution mentioned above in the embodiment of the present application can achieve the following beneficial effects. The voice coil motor including the inner and the outer coil modules without permanent magnets can be used to solve the problem that the voice coil motor with permanent magnets cannot maintain stability scenarios with high temperature, etc. In addition, by obtaining the force feedback information sent by the executing mechanism of the voice coil motor, combined with the expectation force instruction, the inner coil current instruction can be determined. Thus, the closed-loop control of the inner coil electromagnetic force can be finally achieved, and the control accuracy and the control range of the motor acting force can be improved, thereby enabling the voice coil motor in the present application to be applied to scenes where accuracy control is required, such as robot fingers.

BRIEF DESCRIPTION OF THE DRAWINGS

Drawings described here are used to provide a further understanding of the present application and constitute a part of the present application. Embodiments and descriptions of the present application are used to explain the present application and do not constitute an improper limitation to the present application.

FIG. 2 is a schematic flowchart of a method for controlling the voice coil motor according to an embodiment of the present application.

DETAILED DESCRIPTION OF THE EMBODIMENTS

To make the purpose, technical solutions and advantages of the present application more clearly, the technical solutions of the present application will be illustrated more clearly and completely in the following with reference to the embodiments and the accompanying drawings of the present application. Apparently, the described embodiments are only some embodiments of the present application, not all of the embodiments. Based on the embodiments of the present application, other embodiments obtained by those skilled in the art without creative efforts fall within the scope of the present application.

The technical concept of the present application is that, instead of using the voice coil motor with the permanent magnet, the electromagnetic coil module is used to achieve the stability of the magnetic field in multiple scenarios, and the inner coil electromagnetic force generated by the inner coil module is controlled through a force closed loop, which improves the control accuracy and the control range of the motor acting force generated by the executing mechanism.

Technical solutions in the embodiments of the present application will be described in detail below with reference to the accompanying drawings.

Figure 1:
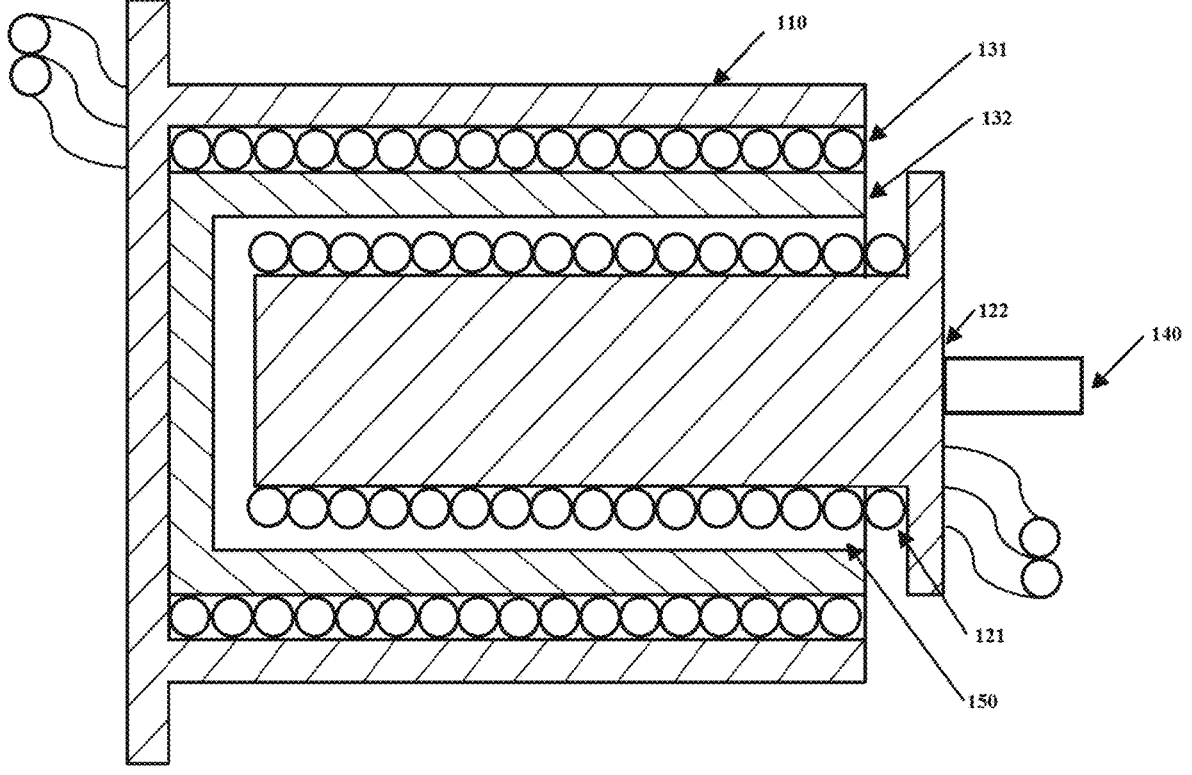
FIG. 1 is a structural schematic view of a voice coil motor according to an embodiment of the present application.

FIG. 1 is a structural schematic view of a voice coil motor according to an embodiment of the present application. As shown in FIG. 1, the voice coil motor 100 includes a base 110, a movable inner coil module, an outer coil module and an executing mechanism 140. The outer coil module is embedded at the base 110, and the inner coil module is arranged inside the outer coil module. An air gap 150 is formed between the inner coil module and the outer coil module, allowing the inner coil module to perform frictionless movement therein. The executing mechanism 140 is connected to the inner coil module.

In some embodiments, both the outer coil module and the inner coil module are including the iron core and the coil wound around the iron core. As shown in FIG. 1, the outer coil module includes an outer coil 131 and an outer coil iron core 132. The inner coil module includes an inner coil 121 and an inner coil iron core 122.

The executing mechanism 140 can be connected to an end of the inner coil core iron 122 and can be driven by the inner coil module for moving. After electrification, the outer coil module can generate the outer coil electromagnetic force, and the inner coil module can generate the inner coil electromagnetic force, so that the executing mechanism 140 can externally apply a motor acting force according to the outer coil electromagnetic force and the inner coil electromagnetic force. The inner coil electromagnetic force and the outer coil electromagnetic force can be accurately controlled according to the method and the device for controlling the voice coil motor shown in the following embodiments.

In some embodiments, for the voice coil motor 100, a force sensor is provided at the end of the executing mechanism 140 for generating the force feedback information and sending the force feedback information to the device for controlling the voice coil motor.

FIG. 2 is a schematic flowchart of a method for controlling the voice coil motor according to an embodiment of the present application, which can be used to control the voice coil motor in the above embodiment, and the method for controlling the voice coil motor can be implemented by a device for controlling the voice coil motor. As shown in FIG. 2, the method for controlling the voice coil motor includes:

operation S210, driving the outer coil module of the voice coil motor to generate an outer coil electromagnetic force.

In some embodiments, the outer coil module can generate a constant outer coil electromagnetic force even if the outer coil module generates a stable electromagnetic field, thereby overcoming the problem that the magnetic field of the permanent magnet is easy to change in scenarios with high temperature, high heat and impact.

In other embodiments, the outer coil electromagnetic force generated by the outer coil module can also be adapted to the inner coil electromagnetic force generated by the inner coil module, to improve the control accuracy of the inner coil electromagnetic force.

Operation S220, determining an inner coil current instruction according to an expectation force instruction and force feedback information sent by an executing mechanism of the voice coil motor.

The expectation force instruction may indicate the value of the motor acting force generated by the voice coil motor, that is, an expectation value of the representational force. The specific value can be determined according to the actual requirements. For example, the planning software is used to generate the expectation force instruction according to the process requirements. For example, a force instruction trajectory that changes with time can be obtained by using the generated expectation force instruction.

However, the motor acting force generated by the executing mechanism is difficult to completely match the expectation force instruction, and there may be some errors. In order to improve the control accuracy in accuracy requirements scenarios, the force closed-loop control can be used. That is, according to the expectation force instruction and the force feedback information, the inner coil current instruction can be determined.

The inner coil electromagnetic force changes with the value of the inner coil current. Therefore, once the inner coil current instruction is determined, operation S230, driving the inner coil module of the voice coil motor to generate an inner coil electromagnetic force according to the inner coil current instruction, can be executed.

Operation S240, enabling the executing mechanism to generate a motor acting force according to the outer coil electromagnetic force and the inner coil electromagnetic force. The principle of the two types of electromagnetic forces generating motor acting forces is the same as the operating principle of the voice coil motor, and will not be repeated here.

It can be seen that the method shown in FIG. 2 can effectively control the voice coil motor including the inner and the outer coil modules without permanent magnets, and can solve the problem that the voice coil motor with permanent magnets cannot maintain stability scenarios with high temperature, etc. In addition, by obtaining the force feedback information sent by the executing mechanism of the voice coil motor, combined with the expectation force instruction, the inner coil current instruction can be determined. Thus, the closed-loop control of the inner coil electromagnetic force can be finally achieved, and the control accuracy and the control range of the motor acting force can be improved, thereby enabling the voice coil motor in the present application to be applied to scenes where accuracy control is required, such as robot fingers.

In some embodiments, for the method for controlling the voice coil motor, operation S210 further includes: determining an outer coil force instruction according to the expectation force instruction; determining an outer coil current instruction according to the outer coil force instruction; obtaining outer coil current feedback information, and determining the outer coil drive instruction according to the outer coil current instruction and the outer coil current feedback information; and driving the outer coil module to generate the outer coil electromagnetic force according to the outer coil drive instruction.

Figure 3:
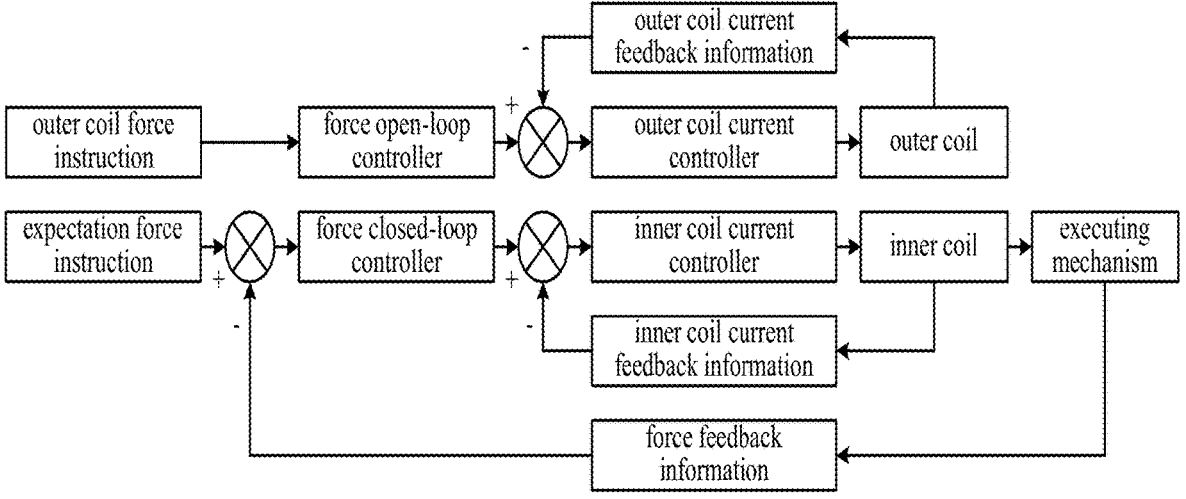
FIG. 3 is a control schematic diagram of the voice coil motor according to an embodiment of the present application.

FIG. 3 is a control schematic diagram according to an embodiment of the present application, and the control of the outer coil electromagnetic force is independent of the control of the inner coil electromagnetic force.

For the control of the outer coil electromagnetic force, the outer coil force instruction should be determined first. For example, the outer coil force instruction $F_o$ can be calculated from the expectation force instruction $F_r$ according to the following formula: $F_o=\alpha \cdot F_r$. $\alpha$ is the conversion coefficient, that is, the conversion relationship between the expectation value of the outer coil electromagnetic force and the expectation value of the motor acting force. In this case, with varying requirements for the motor acting force, the outer coil electromagnetic field will correspondingly change, thereby facilitating the control of the inner coil electromagnetic force.

Then, the outer coil force instruction is input to the force open-loop controller to generate the outer coil current instruction, and the generated outer coil current instruction is input into the outer coil current controller. That is, based on the considerations similar to the foregoing embodiments, the outer coil current can be controlled more accurately through the outer coil current feedback information.

The outer coil current controller determines the outer coil drive instruction according to the outer coil current instruction and the outer coil current feedback information, thereby driving the outer coil module to generate the outer coil electromagnetic force.

In some embodiments, for the method for controlling the voice coil motor, the determining the outer coil current instruction according to the outer coil force instruction includes determining the outer coil current instruction according to a coil length, the number of turns, a magnetic pole area and a magnetic permeability of the outer coil module, and the outer coil force instruction.

Specifically, the following calculation formula is used to obtain the outer coil current instruction $I_o$.

The outer coil current instruction $I_o=\sqrt{2F_o l^2/\mu A N^2}$. $F_o$ is the outer coil force instruction. $l$ is the coil length of the outer coil module. $\mu$ is the magnetic permeability. A is the magnetic pole area of the outer coil module. N is the number of coil turns of the outer coil module.

In some embodiments, for the method for controlling the voice coil motor, the determining the outer coil drive instruction according to the outer coil current instruction and the outer coil current feedback information includes: determining an outer coil current difference value according to the outer coil current instruction and the outer coil current feedback information; and performing corresponding calculations on the outer coil current difference value with an outer coil current loop proportional gain, an outer coil current loop integral gain and an outer coil current loop differential gain respectively, and using calculated values to determine the outer coil drive instruction.

In some embodiments, the outer coil drive instruction can be determined according to a PID (proportion, integration, differentiation) control algorithm, that is, the outer coil current controller in FIG. 3 can include a proportional controller, an integral controller and a differential controller. For example, the outer coil current difference value $\Delta I_o$ can be determined according to the outer coil current instruction and the outer coil current feedback information, then the outer coil drive instruction $U_o$ can be obtained according to the following calculation formula.

The outer coil drive instruction $U_o=K_{P_o}\cdot\Delta I_o+K_{I_o}\cdot\int\Delta I_o+K_{D_o}\cdot\Delta^- I_o$. $K_{P_o}$ is the outer coil current loop proportional gain. $K_{I_o}$ is the outer coil current loop integral gain, and $K_{D_o}$ is the outer coil current loop differential gain.

In some embodiments, for the method for controlling the voice coil motor, operation S220 further includes: determining a force difference value according to the expectation force instruction and the force feedback information; and performing corresponding calculations on the force difference value with a force closed-loop proportional gain, a force closed-loop integral gain and a force closed-loop differential gain respectively, and using calculated values and the expectation force instruction to determine the inner coil current instruction.

As shown in FIG. 3, the expectation force instruction and the force feedback information are input into the force closed-loop controller to obtain the inner coil current instruction. The force closed-loop controller can also include a proportional controller, an integral controller, and a differential controller. The force difference value $\Delta F$ is determined according to the expectation force instruction and the force feedback information, and the inner coil current instruction $I_i$ can be obtained according to the following calculation formula.

The inner coil current instruction $I_i=J\cdot F_a+(K_{P_F}\cdot\Delta F+K_{I_F}\cdot\int\Delta F+K_{D_F}\cdot\Delta^- F)$. J is the preset conversion coefficient. $F_a$ is the expectation force instruction. $K_{P_F}$ is the force closed-loop proportional gain. $K_{I_F}$ is the force closed-loop integral gain. $K_{D_F}$ is the force closed-loop differential gain.

In some embodiments, for the method for controlling the voice coil motor, operation S230 further includes: obtaining inner coil current feedback information; determining an inner coil drive instruction according to the inner coil current instruction and the inner coil current feedback information; and driving the inner coil module of the voice coil motor to generate the inner coil electromagnetic force according to the inner coil drive instruction.

As shown in FIG. 3, based on considerations similar to the foregoing embodiments, the inner coil current can be controlled more accurately by obtaining the inner coil current feedback information, so that the generated inner coil electromagnetic force is more in line with the expectation value. The inner coil current instruction and the inner coil current feedback information are input into the inner coil current controller to obtain the inner coil drive instruction, thereby driving the inner coil module of the voice coil motor to generate inner coil electromagnetic force.

In some embodiments, for the method for controlling the voice coil motor, the determining the inner coil drive instruction according to the inner coil current instruction and the inner coil current feedback information includes: determining an inner coil current difference value according to the inner coil current instruction and the inner coil current feedback information; and performing corresponding calculations on the inner coil current difference value with an inner coil current loop proportional gain, an inner coil current loop integral gain and an inner coil current loop differential gain, and using calculated values to determine the inner coil drive instruction.

As shown in FIG. 3, the inner coil current controller can also include a proportional controller, an integral controller and a differential controller. The inner coil current difference value $\Delta I_i$ can be determined according to the inner coil current instruction and the inner coil current feedback information. The inner coil drive instruction $U_i$ can be obtained according to the following calculation formula.

The inner coil drive instruction $U_i = K_{P_i} \cdot \Delta I_i + K_{I_i} \cdot \int \Delta I_i + K_{D_i} \cdot \Delta^{-1} I_i$. $K_{P_i}$ is the inner coil current loop proportional gain. $K_{I_i}$ is the inner coil current loop integral gain. $K_{D_i}$ is the inner coil current loop differential gain.

According to FIG. 3, the outer coil module electromagnetic force and the inner coil module electromagnetic force are controlled synchronously. By controlling the outer coil electromagnetic force, the magnetic induction intensity of the outer coil electromagnetic field can be controlled. In this way, the inner coil electromagnetic force can be located at the optimum position of the outer coil electromagnetic field, thereby improving the accuracy of the motor acting force.

Figure 4:
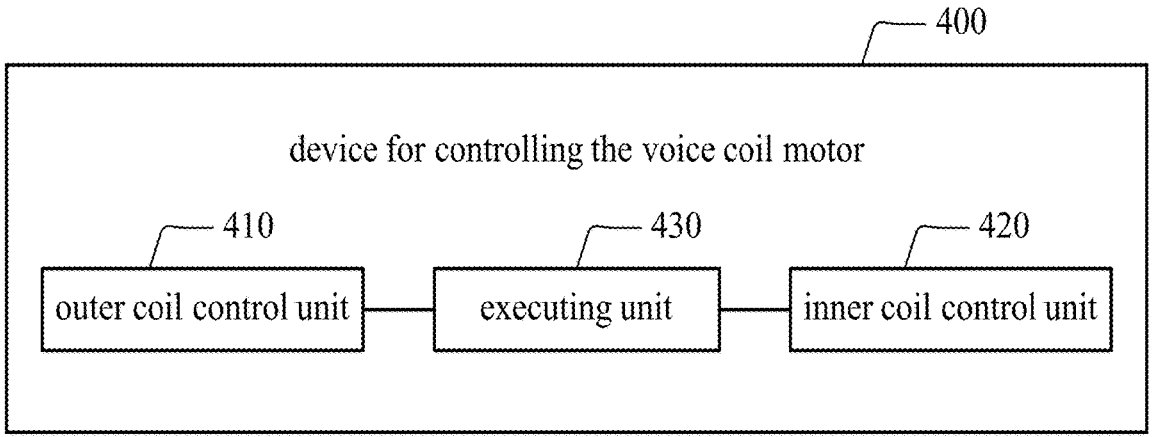
FIG. 4 is a structural schematic diagram of a device for controlling the voice coil motor according to an embodiment of the present application.

FIG. 4 is a structural schematic diagram of a device for controlling the voice coil motor according to an embodiment of the present application, and the device for controlling the voice coil motor can control the voice coil motor as described in the above embodiments. As shown in FIG. 4, the device for controlling the voice coil motor 400 includes:

an outer coil control unit 410 configured to drive the outer coil module of the voice coil motor to generate the outer coil electromagnetic force.

In some embodiments, the outer coil module can generate a constant outer coil electromagnetic force even if the outer coil module generates a stable electromagnetic field, thereby overcoming the problem that the magnetic field of the permanent magnet is easy to change in scenarios with high temperature, high heat and impact.

In some other embodiments, the outer coil electromagnetic force generated by the outer coil module can also be adapted to the inner coil electromagnetic force generated by the inner coil module, to improve the control accuracy of the inner coil electromagnetic force.

The inner coil control unit 420 is configured to determine an inner coil current instruction according to an expectation force instruction and the force feedback information sent by an executing mechanism of the voice coil motor, and drive the inner coil module of the voice coil motor to generate an inner coil electromagnetic force according to the inner coil current instruction.

The expectation force instruction may indicate the value of the motor acting force generated by the voice coil motor, that is, an expectation value of the representational force. The specific value can be determined according to the actual requirements. For example, the planning software is used to generate the expectation force instruction according to the process requirements. For example, a force instruction trajectory that changes with time can be obtained by using the generated expectation force instruction.

However, the motor acting force generated by the executing mechanism is difficult to completely match the expectation force instruction, and there may be some errors. In order to improve the control accuracy in accuracy requirements scenarios, the force closed-loop control can be used. That is, according to the expectation force instruction and the force feedback information, the inner coil current instruction can be determined.

The inner coil electromagnetic force changes with the value of the inner coil current. Therefore, once the inner coil current instruction is determined, the inner coil module of the voice coil motor can be driven to generate an inner coil electromagnetic force.

An executing unit 430 is configured to allow the executing mechanism to generate a motor acting force according to the outer coil electromagnetic force and the inner coil electromagnetic force.

It can be seen that the device shown in FIG. 4 can effectively control the voice coil motor including the inner and the outer coil modules without permanent magnets, and can solve the problem that the voice coil motor with permanent magnets cannot maintain stability scenarios with high temperature, etc. In addition, by obtaining the force feedback information sent by the executing mechanism of the voice coil motor, combined with the expectation force instruction, the inner coil current instruction can be determined. Thus, the closed-loop control of the inner coil electromagnetic force can be finally achieved, and the control accuracy and the control range of the motor acting force can be improved, thereby enabling the voice coil motor in the present application to be applied to scenes where accuracy control is required, such as robot fingers.

In some embodiments, for the device for controlling the voice coil motor, the outer coil control unit 410 is configured to determine an outer coil force instruction according to the expectation force instruction, determine an outer coil current instruction according to the outer coil force instruction, obtain outer coil current feedback information, determine an outer coil drive instruction according to the outer coil current instruction and the outer coil current feedback information, and drive the outer coil module to generate the outer coil electromagnetic force according to the outer coil drive instruction.

In some embodiments, for the device for controlling the voice coil motor, the outer coil control unit 410 is configured to determine the outer coil current instruction according to a coil length, the number of turns, a magnetic pole area and a magnetic permeability of the outer coil module, and the outer coil force instruction.

In some embodiments, for the device for controlling the voice coil motor, the outer coil control unit 410 is configured to determine an outer coil current difference value according to the outer coil current instruction and the outer coil current feedback information, perform corresponding calculations on the outer coil current difference value with an outer coil current loop proportional gain, an outer coil current loop integral gain and an outer coil current loop differential gain respectively, and use calculated values to determine the outer coil drive instruction.

In some embodiments, for the device for controlling the voice coil motor, the inner coil control unit 420 is configured to determine a force difference value according to the expectation force instruction and the force feedback information, perform corresponding calculations on the force difference value with a force closed-loop proportional gain, a force closed-loop integral gain and a force closed-loop differential gain respectively, and use calculated values and the expectation force instruction to determine the inner coil current instruction.

In some embodiments, for the device for controlling the voice coil motor, the inner coil control unit 420 is configured to obtain inner coil current feedback information, determine an inner coil drive instruction according to the inner coil current instruction and the inner coil current feedback information, and drive the inner coil module of the voice coil to generate the inner coil electromagnetic force according to the inner coil drive instruction.

In some embodiments, for the device for controlling the voice coil motor, the inner coil control unit 420 is configured to determine an inner coil current difference value according to the inner coil current instruction and the inner coil current feedback information, perform corresponding calculations on the inner coil current difference value with an inner coil current loop proportional gain, an inner coil current loop integral gain and an inner coil current loop differential gain, and use calculated values to determine the inner coil drive instruction.

It can be understood that the device for controlling the voice coil motor mentioned above can realize each operation of the method for controlling the voice coil motor in the foregoing embodiments, and the relevant explanations about the method for controlling the voice coil motor are applicable to the device for controlling the voice coil motor, which will not be repeated here.

Figure 5:
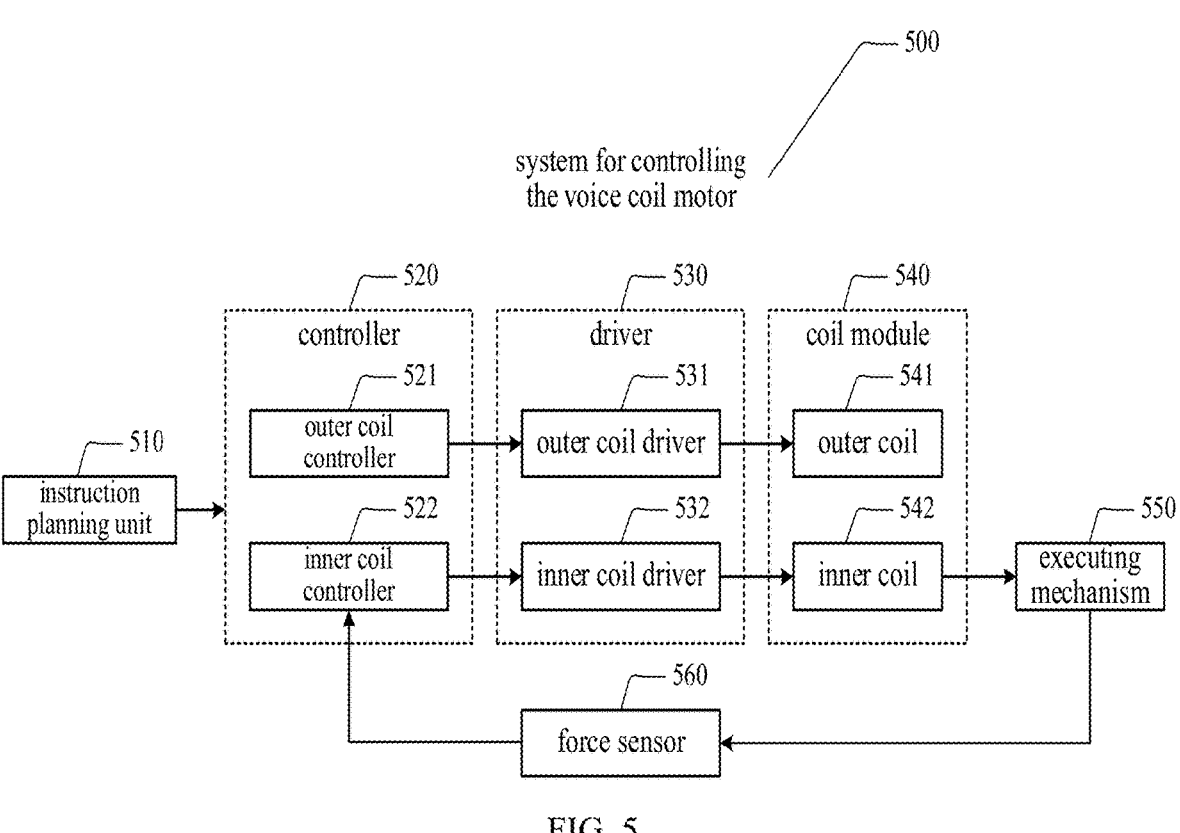
FIG. 5 is a structural schematic diagram of a system for controlling the voice coil motor according to an embodiment of the present application.

FIG. 5 is a structural schematic diagram of a system for controlling the voice coil motor according to an embodiment of the present application. As shown in FIG. 5, the system for controlling the voice coil motor includes an instruction planning unit 510 for generating expectation force instructions, a controller 520, a driver 530, a coil module 540, an executing mechanism 550 and a force sensor 560. The controller 520 includes an outer coil controller 521 and an inner coil controller 522. The driver 530 includes an outer coil driver 531 and an inner coil driver 532. The coil module 540 includes an outer coil 541 and an inner coil 542. It can be seen that the outer coil controller 521 and the outer coil driver 531 form the outer coil control unit 410 in FIG. 4. The inner coil controller 522 and the inner coil driver 532 form the inner coil control unit 420 in FIG. 4.

In the technical solutions of the present application, the voice coil motor including the inner and the outer coil modules without permanent magnets can be effectively controlled, which can solve the problem that the voice coil motor with permanent magnets cannot maintain stability scenarios with high temperature, etc. In addition, by obtaining the force feedback information sent by the executing mechanism of the voice coil motor, combined with the expectation force instruction, the inner coil current instruction can be determined. Thus, the closed-loop control of the inner coil electromagnetic force can be finally achieved, and the control accuracy and the control range of the motor acting force can be improved, thereby enabling the voice coil motor in the present application to be applied to scenes where accuracy control is required, such as robot fingers. Moreover, the outer coil electromagnetic field can also be controlled according to actual requirements, so that the outer coil electromagnetic force can be adapted to the inner coil electromagnetic force, thereby further improving the control accuracy of the inner coil electromagnetic force.

The above are only some embodiments of the present application, and do not limit the scope of the present application thereto. For those skilled in the art, various modifications and changes may be made in the present application. Under the inventive concept of the present application, any modifications, equivalent replacements, improvements, and the like, made according to the present application, fall within the scope of the present application.

What is claimed is:

1. A method for controlling a voice coil motor, wherein the voice coil motor comprises an inner coil module and an outer coil module, and the method comprises:
    installing the inner coil module inside the outer coil module;
    forming an air gap for the inner coil module to move between the inner coil module and the outer coil module;
    driving the outer coil module of the voice coil motor to generate an outer coil electromagnetic force;
    determining an inner coil current instruction according to an expectation force instruction and force feedback information sent by an executing mechanism of the voice coil motor;
    driving the inner coil module of the voice coil motor to generate an inner coil electromagnetic force according to the inner coil current instruction; and
    enabling the executing mechanism to generate a motor acting force according to the outer coil electromagnetic force and the inner coil electromagnetic force,
    wherein the driving the outer coil module of the voice coil motor to generate the outer coil electromagnetic force comprises:
    determining an outer coil force instruction according to the expectation force instruction;
    determining an outer coil current instruction according to the outer coil force instruction;
    obtaining outer coil current feedback information, and determining an outer coil drive instruction according to the outer coil current instruction and the outer coil current feedback information; and
    driving the outer coil module to generate the outer coil electromagnetic force according to the outer coil drive instruction, or
    wherein the driving the inner coil module of the voice coil motor to generate the inner coil electromagnetic force according to the inner coil current instruction comprises:
    obtaining inner coil current feedback information;
    determining an inner coil drive instruction according to the inner coil current instruction and the inner coil current feedback information; and
    driving the inner coil module of the voice coil motor to generate the inner coil electromagnetic force according to the inner coil drive instruction, force.

2. The method of claim 1, wherein the determining the outer coil current instruction according to the outer coil force instruction comprises:
    determining the outer coil current instruction according to a coil length, a number of turns, a magnetic pole area and a magnetic permeability of the outer coil module, and the outer coil force instruction.

3. The method of claim 1, wherein the determining the outer coil drive instruction according to the outer coil current instruction and the outer coil current feedback information comprises:
    determining an outer coil current difference value according to the outer coil current instruction and the outer coil current feedback information; and
    performing corresponding calculations on the outer coil current difference value with an outer coil current loop proportional gain, an outer coil current loop integral gain and an outer coil current loop differential gain respectively, and using calculated values to determine the outer coil drive instruction.

4. The method of claim 1, wherein the determining the inner coil current instruction according to the expectation force instruction and the force feedback information sent by the executing mechanism of the voice coil motor comprises:

determining a force difference value according to the expectation force instruction and the force feedback information; and performing corresponding calculations on the force difference value with a force closed-loop proportional gain, a force closed-loop integral gain and a force closed-loop differential gain respectively, and using calculated values and the expectation force instruction to determine the inner coil current instruction.

5. The method of claim 1, wherein the determining the inner coil drive instruction according to the inner coil current instruction and the inner coil current feedback information comprises:

determining an inner coil current difference value according to the inner coil current instruction and the inner coil current feedback information; and performing corresponding calculations on the inner coil current difference value with an inner coil current loop proportional gain, an inner coil current loop integral gain and an inner coil current loop differential gain respectively, and using calculated values to determine the inner coil drive instruction.

6. A device for controlling a voice coil motor, wherein the voice coil motor comprises an inner coil module and an outer coil module, the inner coil module is arranged inside the outer coil module, an air gap for the inner coil module to move is formed between the inner coil module and the outer coil module, and the device comprises:

an outer coil control unit configured to drive the outer coil module of the voice coil motor to generate an outer coil electromagnetic force;

an inner coil control unit configured to determine an inner coil current instruction according to an expectation force instruction and force feedback information sent by an executing mechanism of the voice coil motor, and drive the inner coil module of the voice coil motor to generate an inner coil electromagnetic force according to the inner coil current instruction; and an executing unit configured to allow the executing mechanism to generate a motor acting force according to the outer coil electromagnetic force and the inner coil electromagnetic force, wherein the outer coil control unit is configured to determine an outer coil force instruction according to the expectation force instruction, determine an outer coil current instruction according to the outer coil force instruction, obtain outer coil current feedback information, determine an outer coil drive instruction according to the outer coil current instruction and the outer coil current feedback information, and drive the outer coil module to generate the outer coil electromagnetic force according to the outer coil drive instruction.

7. The device of claim 6, wherein the inner coil control unit is configured to determine a force difference value according to the expectation force instruction and the force feedback information, perform corresponding calculations on the force difference value with a force closed-loop proportional gain, a force closed-loop integral gain and a force closed-loop differential gain respectively, and use calculated values and the expectation force instruction to determine the inner coil current instruction.

8. The device of claim 6, wherein the inner coil control unit is configured to obtain inner coil current feedback information, determine an inner coil drive instruction according to the inner coil current instruction and the inner coil current feedback information, and drive a voice coil according to the inner coil drive instruction.

9. A voice coil motor, comprising a base, a movable inner coil module, an outer coil module and an executing mechanism, wherein:

the outer coil module is embedded at the base, the inner coil module is arranged inside the outer coil module, and an air gap for the inner coil module to move is formed between the inner coil module and the outer coil module, the executing mechanism is connected to the inner coil module, and the outer coil module generates an outer coil electromagnetic force in response to the device for controlling the voice coil motor of claim 6, and the inner coil module generates an inner coil electromagnetic force in response to the device for controlling the voice coil motor, to allow the executing mechanism to generate a motor acting force according to the outer coil electromagnetic force and the inner coil electromagnetic force.

10. The voice coil motor of claim 9, wherein a force sensor is provided at an end of the executing mechanism, and the force sensor is configured to generate force feedback information and send the force feedback information to the device for controlling the voice coil motor.

* * * * *